(12) United States Patent
Huang

(10) Patent No.: US 6,662,665 B1
(45) Date of Patent: Dec. 16, 2003

(54) TIRE PRESSURE GAUGE MOUNTING STRUCTURE

(76) Inventor: Tien-Tsai Huang, No. 4-2, Lane 30, Wu Chuan St., Pan Chiao City, Taipei (TW)

( * ) Notice: Subject to any disclaimer, the term of this patent is extended or adjusted under 35 U.S.C. 154(b) by 0 days.

(21) Appl. No.: 10/325,870

(22) Filed: Dec. 23, 2002

(51) Int. Cl.⁷ .................................................. G01L 7/00
(52) U.S. Cl. .......................................... 73/756; 73/146
(58) Field of Search ................................... 73/756, 146

(56) References Cited

U.S. PATENT DOCUMENTS 6,175,302 B1 * 1/2001 Huang ........................ 340/442

* cited by examiner

Primary Examiner—Edward Lefkowitz
Assistant Examiner—Andre Allen
(74) Attorney, Agent, or Firm—Bacon & Thomas, PLLC

(57) ABSTRACT

A tire pressure gauge mounting structure is disclosed, which includes a casing and a bottom plate for holding a tire pressure gauge in a vehicle tire, the bottom plate having a first end, a second end, and an extension portion for fastening to the air nozzle or rim of a vehicle tire, the casing having a top wall, a bottom opening, a peripheral wall extended from the top wall around the bottom opening, a front slot in the front part of the peripheral wall for receiving the first end of the bottom plate, a rear slot in the rear part of the peripheral wall for receiving the second end of the bottom plate, and a sloping bottom side notch in the bottom side of the peripheral wall at one lateral side between the front part and the rear part for receiving the extension portion of the bottom plate.

6 Claims, 7 Drawing Sheets

TIRE PRESSURE GAUGE MOUNTING STRUCTURE

BACKGROUND OF THE INVENTION

1. Field of the Invention

The present invention relates to a tire pressure gauge mounting structure and, more particularly, to such a tire pressure gauge mounting structure that can easily be installed in the rim of a vehicle tire to hold a tire pressure gauge inside the vehicle tire.

2. Description of Related Art

Wireless tire pressure indicators are well known. U.S. Pat. No. 6,175,302, entitled "Tire pressure indicator including pressure gauges that have a self-generating power capability", shows a similar design. Because a big centrifugal force is produced during a high speed rotation of the wheels of a motor vehicle, the positioning of a wireless tire pressure gauge in the tire of each wheel of the motor vehicle must be positively assured. Unstable positioning may cause the wireless tire pressure gauge to be damaged. Further, a different model of motor vehicle wheel may have a rim of different shape or size. Therefore, it is desirable to provide a tire pressure gauge mounting structure that can easily and positively be installed in the rim of a vehicle tire and, that fits the rim of any of a variety of vehicle tires.

SUMMARY OF THE INVENTION

The present invention has been accomplished under the circumstances in view. It is the main object of the present invention to provide a tire pressure gauge mounting structure, which is to be installed in the rim of a vehicle tire to hold a tire pressure gauge inside the vehicle tire. It is another object of the present invention to provide a tire pressure gauge mounting structure, which fits the rim of any of a variety of vehicle tires.

To achieve these and other objects of the present invention, the tire pressure gauge mounting structure comprises a bottom plate, and a casing. The bottom plate has a first end, a second end, and an extension portion for fastening to the air nozzle or rim of a vehicle tire. The bottom plate can be molded from plastics, or made from metal. The extension portion of the bottom plate can be made having any of a variety of shapes connectable to the air nozzle or rim of any of a variety of vehicle tires. The so-called "air nozzle" includes the embedded structure of the air nozzle of the vehicle tire inside the rim. The casing has a top wall, a bottom opening, a peripheral wall extended from the top wall around the bottom opening, the peripheral wall having a front part and a rear part, a front slot in the front part of the peripheral wall for receiving the first end of the bottom plate, a rear slot in the rear part of the peripheral wall for receiving the second end of the bottom plate, and a sloping bottom side notch in a bottom side of the peripheral wall at one lateral side between the front part and the rear part for receiving the extension portion of the bottom plate. The casing is adapted to hold a conventional wireless pressure gauge. The casing can be molded from plastics, or made from metal. In order to save the manufacturing cost, the casing is preferably molded from plastics.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
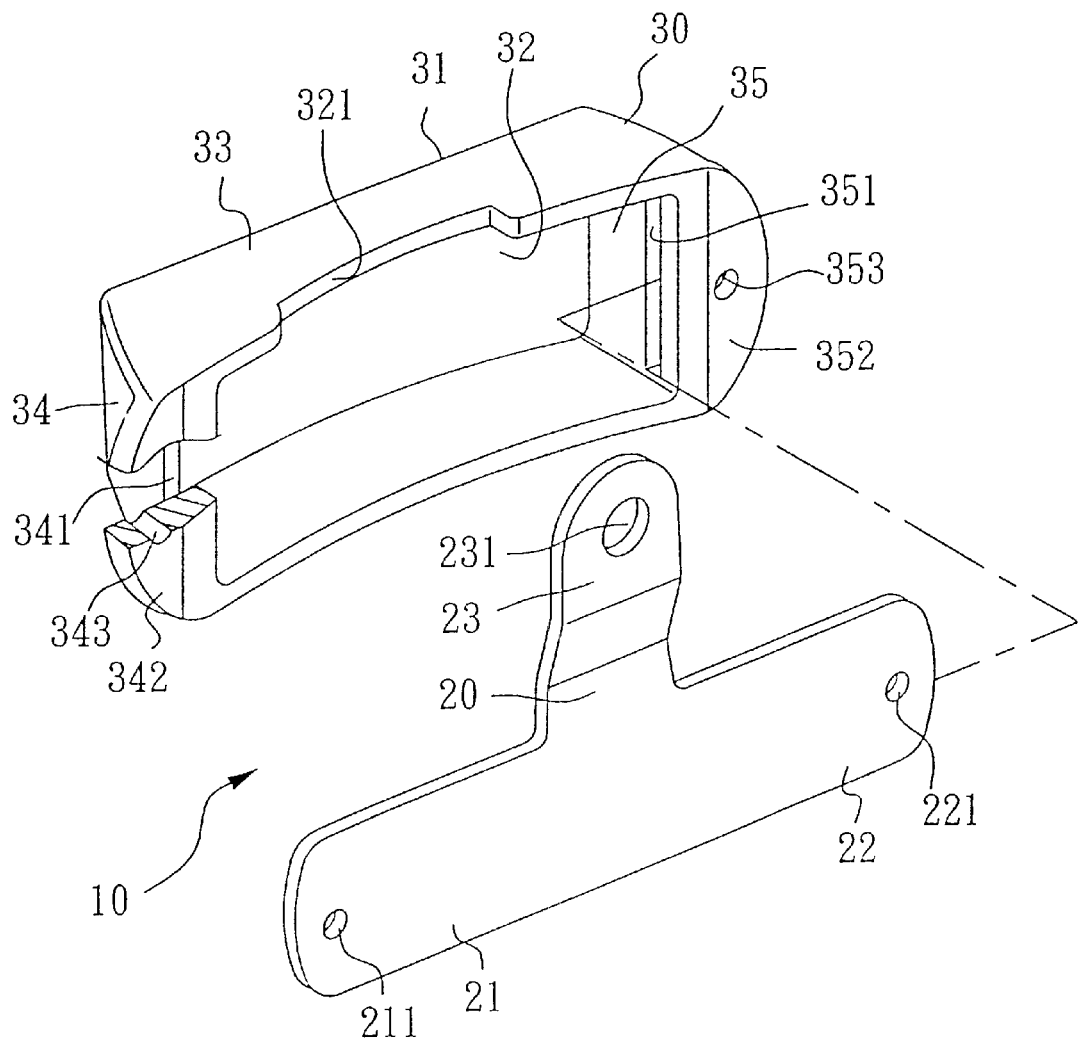
FIG. 1 is an exploded view of a tire pressure gauge mounting structure according to the first embodiment of the present invention.

With reference to FIG. 1, a tire pressure gauge mounting structure 10 in accordance with the first embodiment of the present invention is shown comprised of a casing 30 and a bottom plate 20. The tire pressure gauge (not shown) is fixedly mounted in the casing 30, and then closed by the bottom plate 20.

Figure 2:
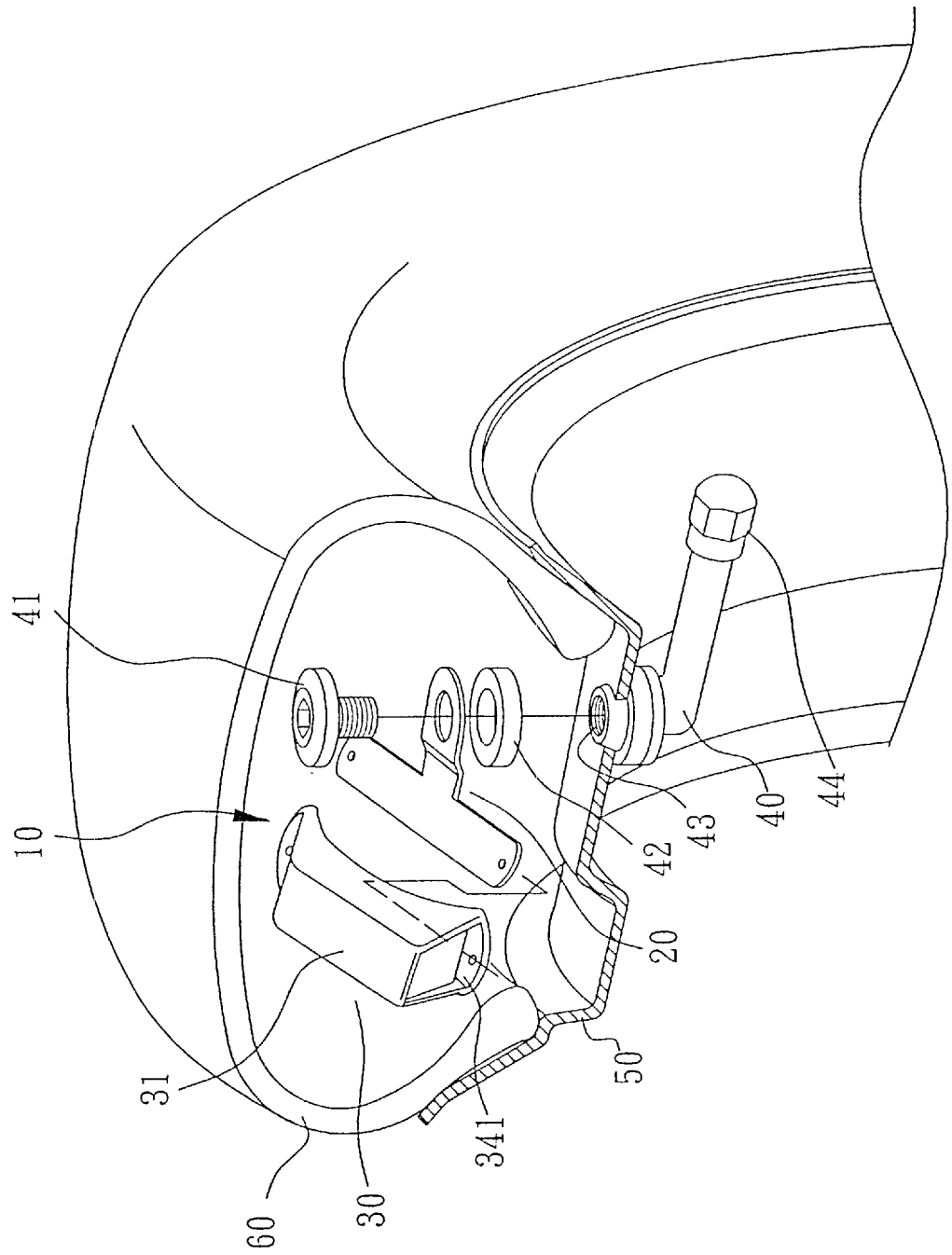
FIG. 2 is a schematic exploded view showing an installation example of the first embodiment of the present invention.
Figure 3:
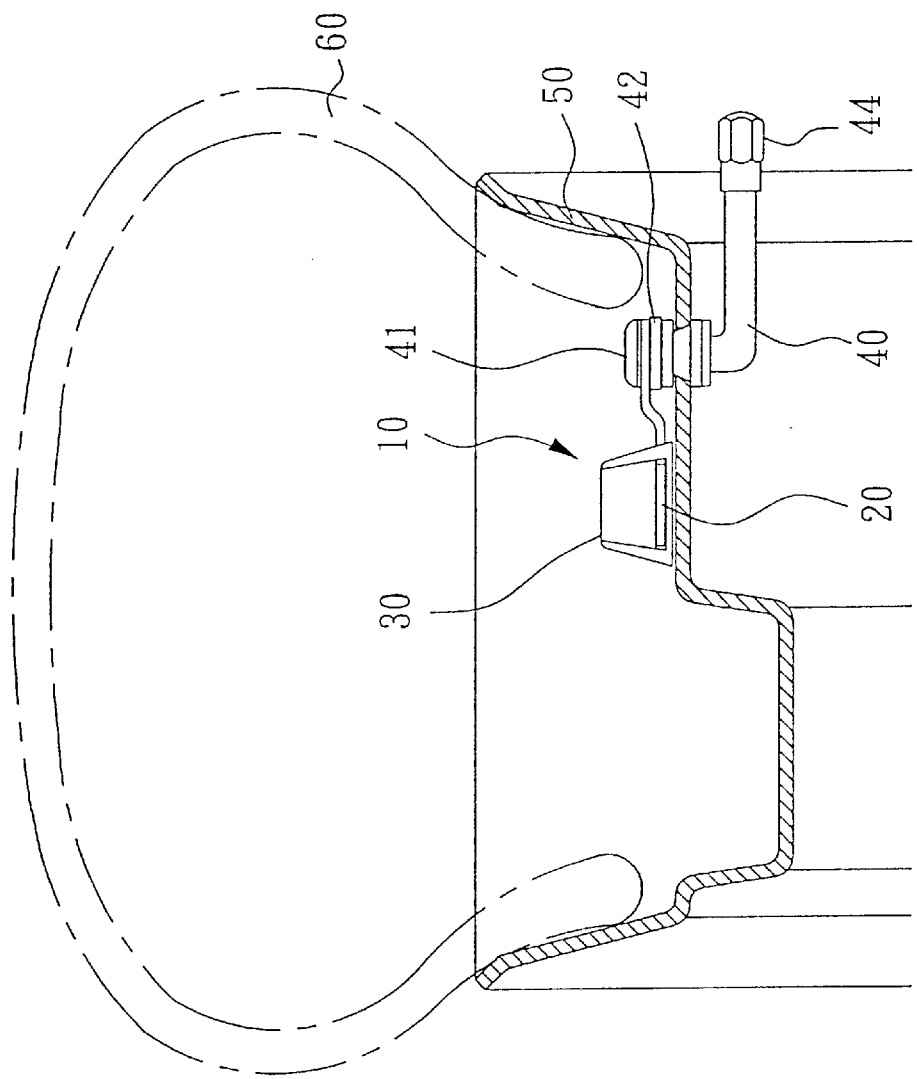
FIG. 3 is a sectional assembly view of FIG. 2.

Referring to FIGS. 2 and 3 and FIG. 1 again, the casing 30 has a top wall 31, a bottom opening 32, a peripheral wall 33 extended from the top wall 31 around the bottom opening 32, a front slot 341 in the front part 34 of the peripheral wall 33, a rear slot 351 in the rear part 35 of the peripheral wall 33, a first lip 342 forwardly protruded from the front part 34 of the peripheral wall 33, a first mounting hole 343 cut through the first lip 342, a second lip 352 backwardly protruded from the rear part 35 of the peripheral wall 33, a second mounting hole 353 cut through the second lip 352, and a sloping bottom side notch 321 in the bottom of the peripheral wall 33 at one lateral side between the front part 34 and the rear part 35. The bottom plate 20 has a first end 21, a second end 22, an extension portion 23, a first through hole 211 in the first end 21 corresponding to the first mounting hole 343 of the casing 30, a second through hole 221 corresponding to the second mounting hole 353 of the casing 30, and a screw hole 231 in the remote end (free end) of the extension portion 23.

Referring to FIGS. 1 and 2 again, the first and second ends 21 and 22 of the bottom plate 20 are respectively inserted through the front slot 341 and rear slot 351 of the casing 30, keeping the bottom plate 21 closely attached to the casing 30. When the casing 30 and the bottom plate 20 fastened together, the extension portion 23 extended out of the casing 30 through the bottom side notch 321 of the casing 30.

Referring to FIG. 1 again, the first and second through holes 211 and 221 of the bottom plate 20 are respectively aligned with the first and second mounting holes 343 and 353 of the casing 30, and secured thereto by a respective rivet, screw, or any of a variety of suitable fastening element. Alternatively, the first and second ends 21 and 22 of the bottom plate 20 can respectively be bonded to the first and second lips 342 and 352 of the casing 30 by welding.

Referring to FIGS. 1~3 again, after the bottom plate 20 and the casing 30 have been fastened together, a hollow screw 41 is threaded into the screw hole 231 of the extension portion 23 and a fixed screw nut 43 in the rim 50 of a tire 60 to fixedly secure the bottom plate 20 and the casing 30 to the air nozzle 40 of the tire 60 at right angles, keeping a gasket ring 42 squeezed in between the extension portion 23 of the bottom plate 20 and the fixed screw nut 43. When installed, the nozzle cap 44 is closed on the air nozzle 40.

Figure 4:
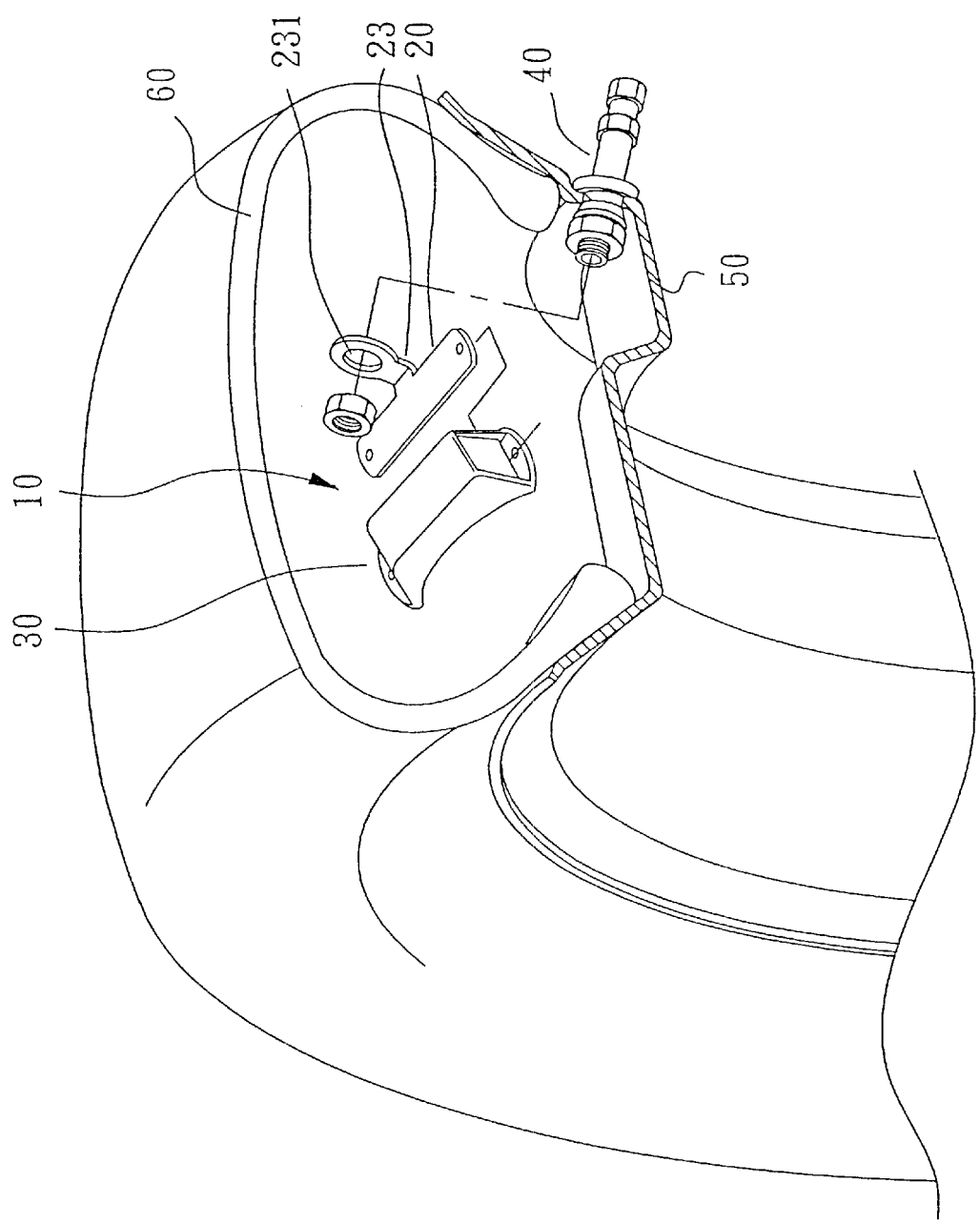
FIG. 4 is a schematic exploded view showing another installation example of the first embodiment of the present invention.
Figure 5:
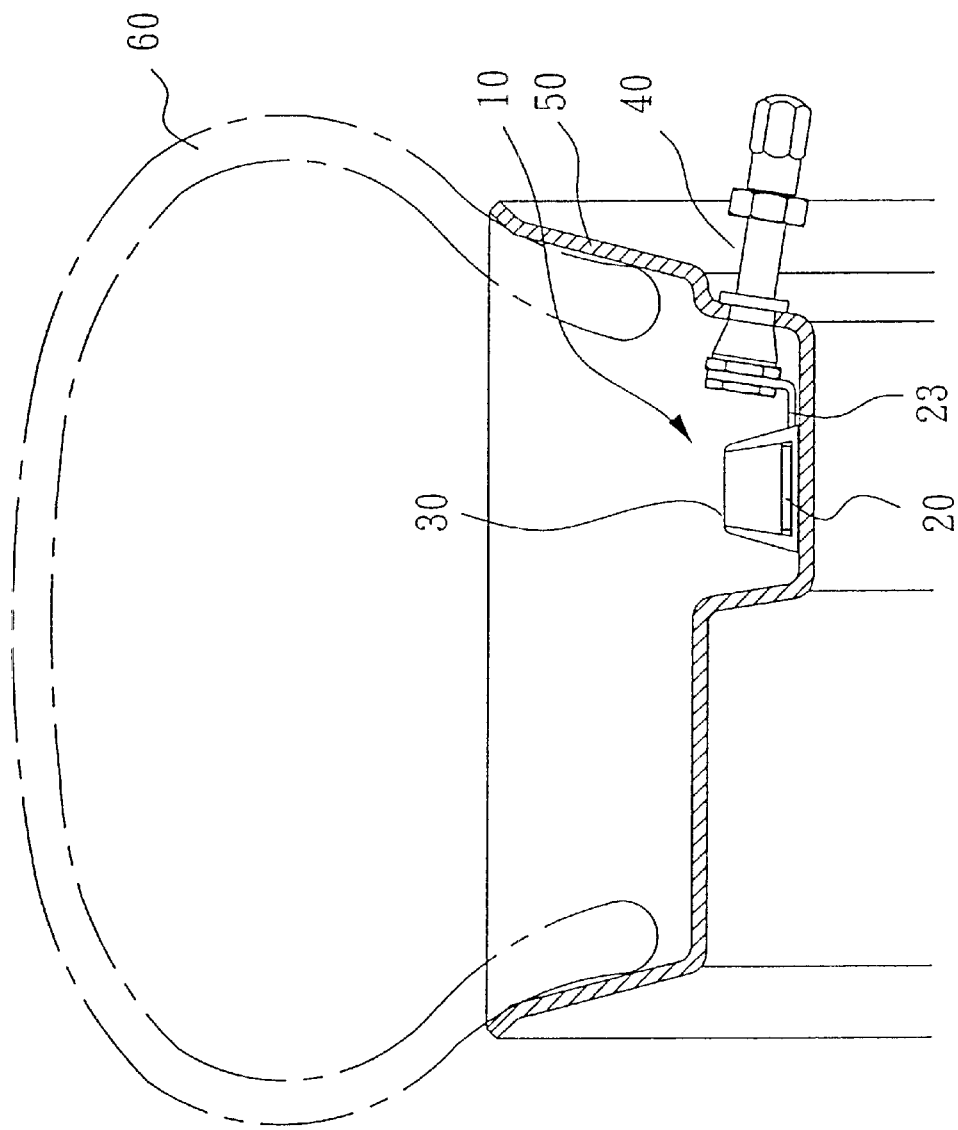
FIG. 5 is a sectional assembly view of FIG. 4.

FIGS. 4 and 5 show a tire pressure gauge mounting structure constructed according to the second embodiment of the present invention. According to this embodiment, the extension portion 23 extends upwardly from the body of the bottom plate 20 at a 45° sloping angle to fit the side-loading air nozzle 40 in one side of the rim 50 of the tire 60.

Figure 6:
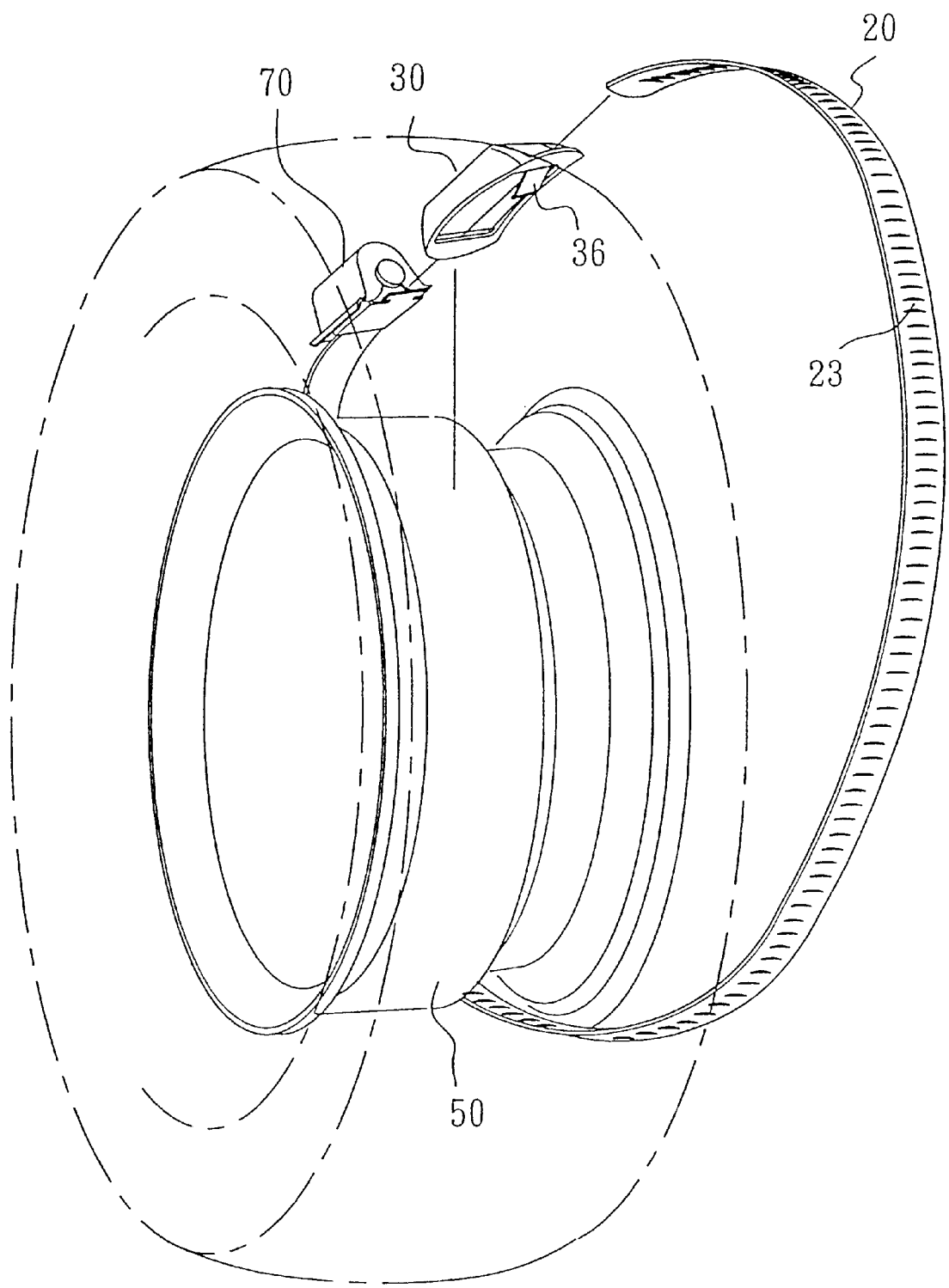
FIG. 6 is an exploded view of the second embodiment of the present invention.
Figure 7:
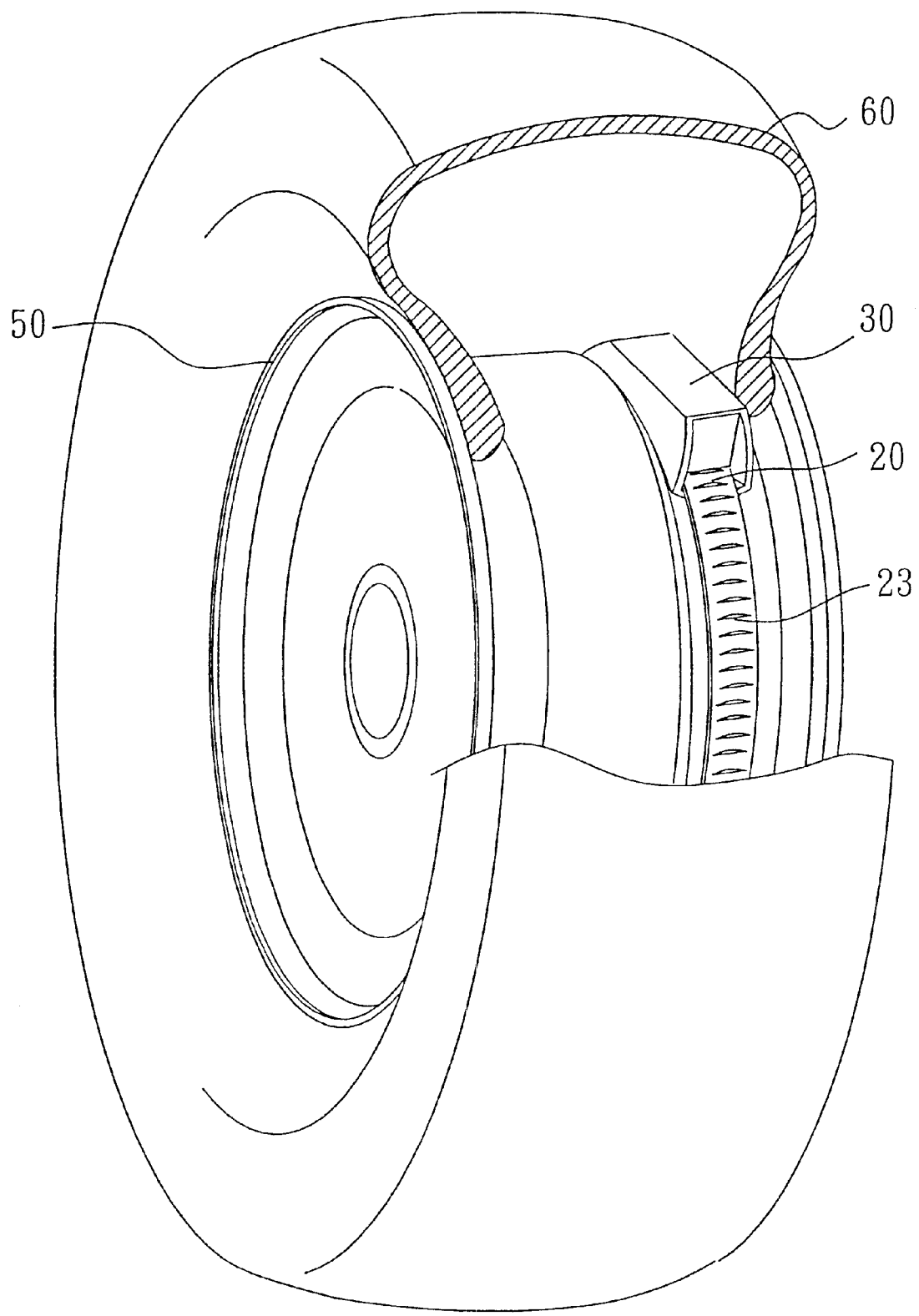
FIG. 7 is a sectional assembly view of FIG. 6.

FIGS. 6 and 7 show a tire pressure gauge mounting structure constructed according to the third embodiment of the present invention. This embodiment is adapted to hold a tire pressure gauge having a transmitter circuit for signal output. According to this embodiment, the extension portion 23 of the bottom plate 20 is a binding strap provided with lock means (for example, a belt buckle) 70 for joining the ends of the binding strap to secure the bottom plate (binding strap) and the casing 30 to the rim 50 of the tire 60. The casing 30 has a grounding terminal 36 for grounding the grounding circuit of the transmitter circuit of the tire pressure gauge (not shown) in the casing 30 to the rim 50 of the tire 60.

A prototype of tire pressure gauge mounting structure has been constructed with the features of FIGS. 1~7. The tire pressure gauge mounting structure functions smoothly to provide all of the features discussed earlier.

Although particular embodiments of the invention have been described in detail for purposes of illustration, various modifications and enhancements may be made without departing from the scope of the invention. Accordingly, the invention is not to be limited except as by the appended claims.

What is claimed is:

1. A tire pressure gauge mounting structure comprising:
   a bottom plate, said bottom plate having a first end, a second end, and an extension portion for fastening to the air nozzle or rim of a vehicle tire; and
   a casing for fastening to said bottom plate, said casing having a top wall, a bottom opening, a peripheral wall extended from said top wall around said bottom opening, said peripheral wall having a front part and a rear part, a front slot in the front part of said peripheral wall for receiving the first end of said bottom plate, a rear slot in the rear part of said peripheral wall for receiving the second end of said bottom plate, and a sloping bottom side notch in a bottom side of said peripheral wall at one lateral side between said front part and said rear part for receiving the extension portion of said bottom plate.

2. The tire pressure gauge mounting structure as claimed in claim 1 wherein said casing has a grounding terminal.

3. The tire pressure gauge mounting structure as claimed in claim 1 wherein said casing has a first lip forwardly protruded from said front part of said peripheral wall and a second lip backwardly protruded from the rear part of said peripheral wall for mounting.

4. The tire pressure gauge mounting structure as claimed in claim 3 wherein said casing further has a first mounting hole cut through said first lip and a second mounting hole cut through said second lip; said bottom plate has a first through hole extended through said first end for fastening to the first mounting hole of said casing and a second through hole extended through said second end for fastening to the second mounting hole of said casing.

5. The tire pressure gauge mounting structure as claimed in claim 1 wherein said bottom plate has a screw hole in said extension portion for fastening to the air nozzle of a vehicle tire.

6. The tire pressure gauge mounting structure as claimed in claim 1 wherein said extension portion of said bottom plate forms a binding strap.

* * * * *